May 18, 1965 L. A. MEACHAM ETAL 3,184,554

SUBSCRIBER CALLING APPARATUS

Filed Sept. 8, 1958 2 Sheets-Sheet 1

INVENTORS L. A. MEACHAM
F. WEST

BY John E. Wagner

ATTORNEY

INVENTORS L. A. MEACHAM
F. WEST
BY John C. Wagner
ATTORNEY 3,184,554

SUBSCRIBER CALLING APPARATUS

Larned A. Meacham, New Providence, and Fred West, Mendham, N.J., assignors to Bell Telephone Laboratories, Incorporated, New York, N.Y., a corporation of New York Filed Sept. 8, 1958, Ser. No. 759,474
18 Claims. (Cl. 179—84)

This invention relates to multifrequency signal generators and more particularly to transistorized signal generators employed to produce calling signals in multifrequency telephone signaling systems.

With the advent of electronic telephone central office systems employing solid state and electronic switching devices characterized by operation at low voltage and current levels in comparison to relay type systems, the emphasis in substation circuit design is toward compatible electronic systems for ringing and dialing or calling. The low voltage and current characteristics allow the systematic use of solid state devices to amplify voice levels, ringing signals, etc. Such devices may similarly be used effectively in the substation to generate alternating current signals used in setting up a call where heretofore the interruption of the loop direct current by the conventional dial has been employed. Alternating current calling offers the advantage of speed in that only a short burst of a selected frequency need be transmitted to indicate a digit as opposed to the train of direct current pulses generated by a dial. Likewise, using alternating current signaling with the frequency of the call signal in the voice range, the signal may be transmitted from end to end of a transmission channel just as voice frequencies are transmitted, facilitating such types of signal transmission as direct distance dialing.

Advantageously, as may be seen in the copending application of the coinventors, L. A. Meacham and L. Schenker, Serial No. 743,434 filed June 20, 1958, now U.S. Patent No. 3,076,059, digit-calling information may be coded in the form of two frequencies in the voice frequency range, each chosen from a distinct group of frequencies and transmitted simultaneously to the telephone central office. Where the total number of signal frequencies is eight, divided into two groups of four, and a signal is made up of one frequency from each group of four, there are sixteen pairs or sixteen distinct valid signals available.

In order to employ such a system, it is essential that the telephone subscriber installation include equipment capable of generating the sixteen signaling combinations under the control of the telephone subscriber. Also from the system standpoint, several requirements are imposed upon the substation calling signal generator. To insure the correctness of each digit, it is essential that the signal generator oscillator be stable in each of the several signal frequencies. Additionally, since the digit signals appear in the form of a pair of frequencies received simultaneously, it is highly desirable that the two frequency components have a predetermined voltage relationship preferably that they be equal. Further, in order to facilitate detection of the signal components, it is desirable that they have a substantially square envelope. All of these signal criteria when met facilitate the detection of the calling signal at the telephone central office. Frequency stability allows the selective circuits of the signal receiver such as bandpass filters to be narrowly tuned to the signaling frequencies and therefore enhance the ability of the receiver to reject interference. When the output of the signal generator contains about half of the energy in each of the two signaling frequencies making up a signal, the central office receiver will be required to accept only two frequencies arriving simultaneously and having approximately the same level, with appropriate allowance for effects of transmission. Also, the facility of detection is a function of the envelope of the transmitted signals. Neither a damped oscillation nor one building up exponentially over an appreciable period of time insures the reliability of detection of one which has a substantially square envelope. With such a signal, particularly where long transmission paths are involved, as in direct distance dialing, the level of threshold of detection and minimum signal length are of much less significance than in the previously mentioned cases.

From the standpoint of the substation installation, simplicity of the signal generator design, low cost and the feasibility of powering from the telephone line are all controlling requirements.

Therefore, it is a general object of this invention to improve telephone call signal generation.

A more specific object of this invention is a stable low cost signal generator employing a single active element which is operative to produce a balanced output of any of several pairs of selected call signal frequencies.

Another object of this invention is to facilitate the generation of such multiple frequency square envelope calling signals.

Still another object of this invention is to facilitate the powering of the station oscillation generator from the telephone central office.

These objects are accomplished in accordance with this invention, one embodiment of which comprises a calling signal generator at a telephone substation arranged to be connected across the telephone line so as to introduce voice frequency oscillations into the line. The signal generator includes a single active element, a transistor, in a circuit including means for supplying electrode biases and a coupling network for introducing positive feedback between the emitter and the base circuits. A pair of tank circuits each having four selectable resonant frequencies are normally connected to store energy supplied over the telephone line and to release the energy as an oscillatory discharge upon operation of any of a plurality of push-buttons. The tank circuits are coupled to the feedback path of the transistor.

One feature of this invention relates to the coupling of a pair of resonant circuits to respective portions of the feedback path of the transistor amplifier whereby the discharge of the resonant circuits is sustained by the transistor circuit at a pair of preselected frequencies.

Another feature of this invention relates to the connection of the resonant circuits across the transistor bias diode whereby a regulated voltage source provides the supply for energy storage in the resonant circuits.

Still another feature of this invention involves the presence of nonlinear elements in the feedback circuit to control the amplitude of oscillation at each frequency.

Still another feature of this invention relates to the correlation of the impedance characteristics of the coupled portions of the feedback network with an emitter resistor whereby the output of the oscillator contains a balanced amount of the pair of selected frequencies.

These and other features of the invention may be understood from the following detailed description and by reference to the drawing where:

Figures 1, 1A:
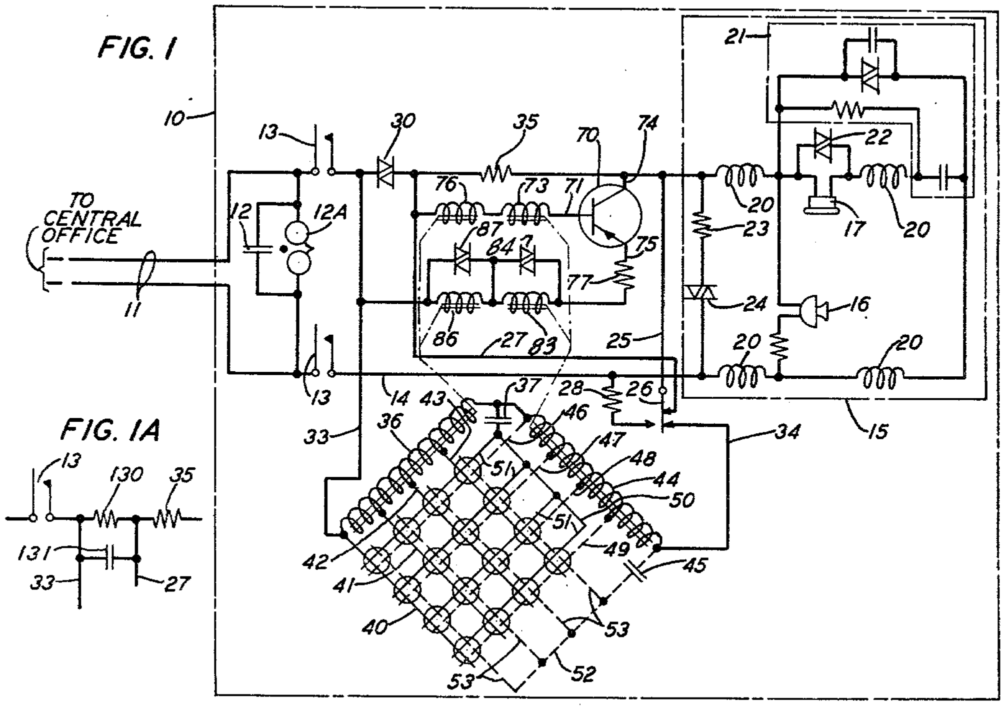
FIG. 1 is an electrical schematic representation of the calling and speech circuits comprising a substation employing this invention.
FIG. 1A is a portion of the circuit diagram of a modification of the circuits of FIG. 1.
Figure 2:
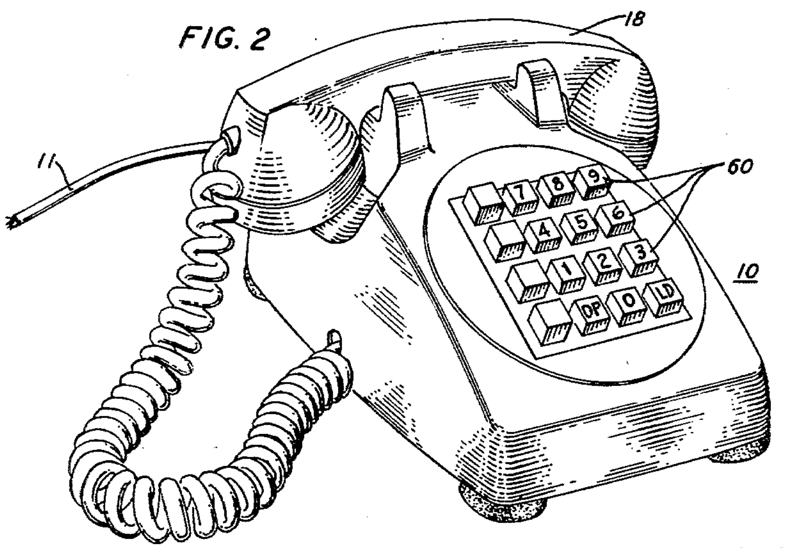
FIG. 2 is a perspective view of a telephone set including pushbuttons for activating the calling circuit.

Referring now to FIGS. 1 and 2, a telephone subscriber set 10 may be seen connected by a pair of telephone line conductors 11 to a telephone central office not shown which includes in the usual fashion a central office battery and a multifrequency calling signal register, preferably of the type disclosed in the copending Meacham-Schenker application cited above. Connected across the line conductors 11 is a conventional telephone ringer 12A and its associated shunt capacitor 12B for false ringing suppression. Each side of the telephone line includes switchhook contacts 13 which serve to connect the speech and calling circuits to the line 11 upon lifting of the telephone handset 18 of FIG. 2. A conductor 14 connects one side of the telephone line 11 to the speech circuit 15 which is of the conventional anti-sidetone type including a transmitter 16, a receiver 17, an induction coil 20, a line impedance balancing network 21, a click suppressor varistor 22 and a shunt impedance branch, including a resistor 23 and a diode 24, for telephone loop length compensation. The speech circuit 15 is connected to the other side of the line 11 through a conductor 25, through normally closed contacts of a transfer switch 26, a conductor 27, a voltage-regulating diode 30, and one switchhook contact 13. Therefore, with the telephone handset 18 lifted from the cradle and both switchhook contacts 13 closed, the speech circuit 15 is effectively placed across the telephone line 11. The speech circuit described is substantially unmodified from conventional telephone sets and the only differences in connections are the presence of the diode 30 and the transfer switch 26 in series therewith. These elements do not affect the speech transmission or reception since the transfer switch 26 is unoperated except during signaling and the diode 30 introduces only an insignificant drop in level.

The calling apparatus of the telephone substation is controlled by the subscriber and is intended to allow the rapid transmission of digit information to the central office. The subscriber, by depression of any of the several pushbuttons 60 of FIG. 2 closes two pairs of contacts, each pair determining a frequency, the combination of the two frequencies indicating the digit. The depression of the pushbuttons also produces switching operations energizing the call signal generating equipment and transmitting the calling signal over the line in the form of the two frequencies determined by the pushbutton, as will hereinafter be described.

Considering now the calling circuits, the originating elements of the calling signal comprise a pair of resonant circuits series connected through a conductor 33 to one side of the diode 30 and through a conductor 34, transfer switch 26 and conductors 27 and 25 to the opposite side of the diode 30. The first resonant circuit includes a tapped coil 36 with a capacitor 37 arranged to be connected across either the entire coil 36 or any of the four sections defined by taps 40, 41, 42 and 43 shown in the drawing as solid lines. The second resonant circuit includes a corresponding coil 44, capacitor 45, and taps 46, 47, 48 and 49, the latter identified by dotted lines. Connected to the capacitor 37 is a bus 50 with conductors 51 extending transversely to taps 40, 41, 42 and 44 to form a matrix of conductors. Connected to the capacitor 45 is a bus 52 with conductors 53 forming a similar matrix with taps 46, 47, 48 and 49 of coil 44.

The two matrices described above are electrically independent of each other at the crosspoints and are shown in overlapping arrangement in FIG. 1 to illustrate their close physical relationship in practical embodiments thereof. Surrounding the area of intersection of the matrices there are shown sixteen circles representative of pushbuttons 60 of FIG. 2, and serving to shunt the capacitors 37 and 45 across sections of coils 36 and 44. The pushbuttons 60, upon their depression close the circuit between the two dash conductors 53 and a respective dash conductor 46, 47, 48 or 49, and simultaneously close the circuit between solid line conductors 51 and one of the respective solid line conductors 40, 41, 42 and 43 thereby establishing the resonant frequencies of two tuned circuits.

Mechanically coupled to the pushbuttons 60 is the transfer switch 26 which is designed upon operation of any of the pushbuttons 60 to open the connection of the resonant circuits to the diode 30 through the conductor 34. The conductors 27 and 34 serve to connect the pair of coils to the diode 30 whereby energy derived from the voltage across diode 30 is stored in the coils during the time that the telephone set 10 is connected to the line and the pushbuttons remain unoperated. Upon operation of any of the pushbuttons, capacitors 37 and 45 are placed across the appropriate tapped portion of the coils 36 and 44, and then the connection through conductor 34 to the voltage source 30 is interrupted whereby a damped oscillation is induced in each of the resonant circuits. The generation of a pair of voice frequency transients as here described is similar to that of the patent of the joint inventor, L. A. Meacham, No. 2,824,173, issued February 18, 1958, and described in the article by L. A. Meacham et al. appearing in Vol. 37 of the Bell System Technical Journal, pages 339–60 (1958).

The resonant circuits, instead of being coupled directly to the telephone line 11 as in the above-mentioned references, are coupled electromagnetically to a transistor amplifier. The active element of the amplifier is a transistor 70 including a base electrode 71 connected through a pair of series windings 73 and 76 and the diode 30 to one side of the telephone line 11, a collector electrode 74 connected through switch 26 and resistor 28 to the other side of the telephone line 11, and an emitter electrode 75 including an emitter resistor 77 and a pair of series windings 83 and 86 which are connected to the opposite side of the diode 30 from the base 71. Resistor 35, connected between the same side of diode 30 as the base 71 and the collector, serves to pass current through diode 30 to establish its nominal conducting voltage and to form a load in parallel with the line to reduce the variation of signal output voltage with line impedance. The emitter circuit windings 83 and 86 are shunted by individual diodes 84 and 87 which serve to regulate the amplitudes of the voltages across the emitter windings 83 and 86. The diodes 84 and 87 as well as diode 30 are preferably each a pair of oppositely poled parallel connected Western Electric Co. type 420B varistors which exhibit a high resistance up to 0.7 volt peak amplitude above which the resistance falls rapidly.

The transistor oscillator is powered over the telephone line 11 and the emitter bias is obtained through the voltage drop across the diode 30. The single transistor, being the only active element in the circuit is in actuality a linear amplifier since, as will hereinafter be described, the amplitude regulation of the oscillation is achieved through a unique characteristic of the feedback path rather than any nonlinear characteristics of the transistor itself.

In the embodiment of FIG. 1, the reference voltage establishing element in the substation 10 is diode 30 which produces a constant voltage drop throughout the range of central office substation loops. The constant voltage drop of diode 30 produces a constant current through transitsor 70, thereby eleminating the possibility of transistor overloading on short loops.

Where the protection of the transistor in this manner is not necessitated, a constant resistance reference voltage establishing element may be used as shown in FIG. 1A. There a resistor 130 bypassed by a capacitor 131 is substituted for the diode 30. Although both embodiments of this invention are operative, the form of FIG. 1 is preferred since it provides transistor protection and is also more economical since the two components required to provide the constant resistance circuit in typical applications exceed the cost of the single diode 30.

Figure 3:
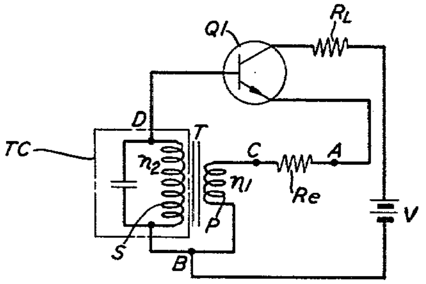
FIG. 3 is an electrical schematic diagram of a simplified form of the signaling circuit of this invention.

An understanding of the operation of the transistor circuit may be had upon consideration of its simplified form as shown in FIG. 3. There it may be seen as comprising a transistor Q1 with a tuned circuit TC in its base lead and the emitter lead including a resistor $R_e$ and a winding P coupled to coils of the tuned circuit TC. A battery V and a load resistor $R_L$ complete the simplified circuit. With this arrangement, a portion of the output of the transistor Q1, as determined in part by the magnitude of the resistor $R_e$, is returned to the base lead by the transformer action of the coupled windings P and S. Since an emitter follower configuration exists, the voltage gain of the amplifier is essentially unity and the voltage or turns radio $n_2/n_1=K$ of the coupled windings P and S must exceed unity to provide a return of energy to the base circuit of the transistor Q1. If K is made equal to 2, the transformer coupling is ideal, and the amplifier has a voltage gain of 1 with a phase shift $\theta$ of 0, then to make $\mu\beta=1\angle 0°$ at resonance, i.e., to meet the requirement for critically sustained oscillations, the emitter resistor $R_e$ must have a value equal to $R_{n1}$ where $R_{n1}$ is the resonant resistance of the transformer at the terminals of the winding P.

Figure 4A:
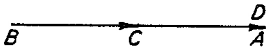
FIGS. 4A, 4B and 4C are phase diagrams of the circuit of FIG. 3.
Figure 4B:
Figure 4C:
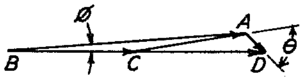

The voltage vector diagram for this condition, with vectors designated in accordance with the capital letters of FIG. 3, is shown in FIG. 4A while FIG. 4B shows the vector diagram with a phase shift of zero, but with the amplifier voltage gain less than one and $R_e$ sufficiently less than $R_{n1}$ to make $\mu\beta=1$. Vector AD, the difference between the voltages BD and BA, is the base-emitter or input voltage of the amplifier and BA is the output voltage. FIG. 4C adds an inherent amplifier phase shift $\theta$ to the conditions of FIG. 4B. It will be noted from FIG. 4C that the phase shift $\Phi$, required of the tuned circuit to make $\mu\beta=1\angle 0$ is much less than $\theta$. Here it should be noted that there is equivalence between the vector diagrams of FIG. 4 and those for the bridge stabilized oscillator of L. A. Meacham, described in the Bell System Technical Journal, vol. 18, pp. 574–590, October 1938, and hence that the stability characteristics are analogous.

Automatic maintenance of $\mu\beta=1$ is achieved in the meacham oscillator by using a thermally variable resistance as one arm of the bridge. The comparable element in FIG. 3 is resistor $R_e$ which could be similarly used to control $\mu\beta$. However, a problem is posed by the necessity of separating the alternating and steady components of the emitter current since only the alternating component is wanted for the control of gain. Further, since it is desired to employ the amplifier for the simultaneous generation of two frequencies, two tuned circuits are involved and the control of $R_e$ could not simultaneously control $\mu\beta$ for both circuits. Therefore the use of $R_e$ as a gain control is abandoned in favor of a voltage-critical resistor shunting a section of the tuned tranformer, such as $n_2$. This resistor varies the Q of the coil and hence the gain of the tuned circuit. A suitable resistor is a silicon junction varistor which has the characteristic of an extremely high resistance up to a voltage of about 0.7 at which the resistance falls rapidly. With this element, by choosing $R_e$ so that $\mu\beta$ is only slightly greater than 1 and properly designing the coil, good gain control is attainable without serious deterioration of Q.

The essential connection of the circuit for two-frequency oscillation is shown in FIG. 1. Two separately tuned transformers, made up of windings 44, 73 and 83 and 36, 76 and 86, respectively, are connected with corresponding windings in series to replace the single tuned transformer TC of FIG. 3. Nonlinear elements 84 and 87 are the varistors employed as gain controls. Dual oscillation is possible because no form of amplifier overloading is used for amplitude limiting and hence the amplifier is operated as a linear device capable of supplying energy to the two tuned circuits as well as to the output load, which comprises the line 11 and resistor 35. The source impedance presented in the collector circuit is very high because the alternating component of the collector current is determined by the voltage applied to the base and the value of the emitter resistance and is essentially independent of the load impedance.

The circuit of FIG. 1 embodies the principles above described in connection with FIG. 3 and is designed as a signal generator which is compatible with existing "high current" telephone systems and electronic or "low current" systems. The tuned transformers made up of windings 44, 83 and 73 and windings 36, 86 and 76, respectively, have taps provided on the windings 44 and 36 so located that they will provide frequencies in the desired code when connected to the fixed capacitors 37 and 45. Selection of the correct tap on each coil for a given signal is made by means of the contacts by operation of the pushbuttons 51. The coils preferably employ ferrite cup cores having adjustable air gaps for control of inductance thus providing means for tuning to the signaling frequencies and permitting moderately wide tolerance in the values of the capacitors 37 and 45.

The transfer switch 26 is mechanically coupled to be actuated by the operation of any pushbutton after the tuning circuit contacts have been closed. This switch operation serves (1) to short-circuit the telephone set during signaling by shunting it with a resistor 28 of low value; (2) to enable the oscillator by breaking the path through the leads 27 and 25 which normally short-circuits the oscillator except for the low impedance of diode 30 to provide the talking path; and (3) to interrupt the direct current flowing through the tuned windings 36 and 43 due to the voltage across the diode 30. The function (1) eliminates the possibility of signal imitation or talk-off during the signaling period because the prime source of talk-off energy, to wit, the transmitter, is effectively short-circuited. The function (1) also minimizes the loss of signal energy in the substation. The very small resistance 28 in series with the conductor 25 makes the transmitted signals audible to the calling subscriber, which is desirable from a psychological standpoint. The function (3) instantaneously starts the oscillation of the tuned coils which is sustained by the oscillator circuit, thereby avoiding a build-up time for the oscillator.

When connected into the normal telephone circuit ample power is supplied by the direct current source at the telephone central office for the generation of the two-frequency signal of desired level. Variations in the direct current level due to varying loop length conditions are compensated for by the presence of the diode 30 which supplies a substantially constant bias voltage to the base of the transistor owing to its sharp conduction characteristic. This constant bias supplied by the diode 30 establishes constant emitter current with a resultant reduction in power dissipation in the transistor on short loops, where direct current voltage at the substation is high. The low alternating current impedance of the bias diode 30 eliminates the need for by-passing it with a capacitor for speech.

The levels of both frequencies fed back to the base circuit are respectively regulated by the nonlinear elements 84 and 87 since the amplitude across windings 83 and 86 during signaling exceeds the conduction threshold of these elements. Therefore under all signaling conditions the output reaches a standard level in both frequencies as determined by the design of the tuned transformers. This latter condition exists even when the signaling frequencies differ by no more than a few hundred cycles per second. Representative signaling frequencies are:

| Digit: | Frequencies (c.p.s.) |
| --- | --- |
| 1 | 1477, 697 |
| 2 | 1336, 697 |
| 3 | 1209, 697 |
| 4 | 1477, 770 |
| 5 | 1336, 770 |
| 6 | 1209, 770 |
| 7 | 1477, 852 |
| 8 | 1336, 852 |
| 9 | 1209, 852 |
| 0 | 1336, 941 |

Component types and values employed in a typical circuit for operation at the above frequencies is tabulated below:

| | |
| --- | --- |
| Transistor **70** | Western Electric Co. type 12D. |
| Capacitor **37** | .33 $\pi$f. |
| Capacitor **44** | .082 $\pi$f. |
| Capacitor **131** | 2 $\pi$f. |
| Transformer (windings **36, 76, 86**) | Inductance of winding **36** 0.63 henry; turns ratio 941:60:120. |
| Transformer (windings **43, 73, 83**) | Inductance of winding **43** 0.63 henry; turns ratio 941:34:68. |
| Resistor **77** | 160 ohms. |
| Resistor **35** | 910 ohms. |
| Resistor **28** | 20 ohms. |
| Resistor **130** | 200 ohms. |
| Diode **30** | Western Electric Co. type 420B varistors. |
| Diode **84** | Do. |
| Diode **87** | Do. |

Figure 5A:
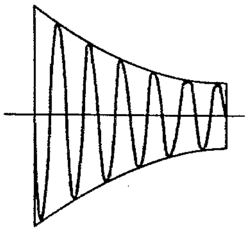
FIGS. 5A, 5B and 5C are graphical representations of three forms of voice frequency signals.
Figure 5B:
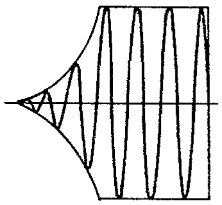
Figure 5C:
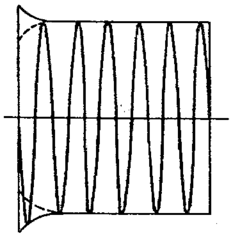

The nature of the envelope of signal generated as compared with that of a simple antiresonant circuit and an oscillator may be seen by reference to FIG. 5. There FIG. 5A is a representation of the damped oscillation in a single frequency as generated by the signaling system of Patent No. 2,824,173 cited above. Next FIG. 5B illustrates the gradual buildup of an oscillator triggered by thermal or other noise. FIG. 5C is a representation of the composite characteristic achieved by the shock-excited oscillator of this invention. The envelope of the signal is substantially rectangular and varies from that form only at the start as determined by the initial amplitude of the shock-excited oscillation of the antiresonant circuits. The solid line indicates the maximum and the dashed line the minimum practical initial amplitude. The shock excitation causes the very first cycle of the oscillator output to have an amplitude approximately equal to that which is determined by the nonlinear elements 84 and 87. There follows a brief exponential adjustment to the steady-state value. The content of the signal, of course, is the two signaling frequencies.

It can be appreciated that the above-described arrangements are merely illustrations of the principles of the invention. Numerous other arrangements and modifications may be devised by one skilled in the art without departing from the spirit and scope of the invention.

What is claimed is:

1. A telephone substation circuit comprising a pair of line terminals arranged to be connected over a telephone line to a telephone central office including a line battery supply and a calling signal receiver, a speech circuit connected to said line terminals, means in series with one line terminal for establishing a reference voltage at said substation when connected to the telephone central office, an oscillation generator including energy storing means normally connected across said reference voltage establishing means, a transistor including base, emitter and collector electrodes, said transistor connected to derive bias voltages from said reference voltage establishing means, a feedback path for said transistor, means coupling said oscillation generator to the feedback path of said transistor and switch means operative to discharge said energy storing means in a preselected frequency and to connect said transistor to the telephone line terminals whereupon an alternating calling signal is introduced into the telephone line.

2. A telephone substation circuit comprising a pair of line terminals arranged to be connected over a telephone line to the telephone central office including a line battery supply and a calling signal receiver, a speech circuit connected to said line terminals, means in series with one line terminal for establishing a reference voltage at said substation when connected to the telephone central office, an oscillation generator comprising a parallel inductor-capacitor combination, means normally connecting said inductor-capacitor combination across said reference establishing means whereby a direct current flows through the inductor when the substation is connected to the telephone central office, a transistor connected to derive electrode bias from said voltage device, means establishing a feedback path for said transistor, means coupling said inductor-capacitor combination to the feedback path of said transistor, said connecting means for said inductor-capacitor combination being manually operable to open the connection of the combination across said reference establishing means whereby an oscillatory discharge is produced sustained by said transistor, said connecting means being operable to connect said transistor to the telephone line.

3. A telephone substation circuit comprising a pair of line terminals arranged to be connected over a telephone line to the telephone central office including a line battery supply and a calling signal receiver, a speech circuit connected to said line terminals, means in series with one line terminal for establishing a reference voltage at said substation when connected to the telephone central office, an oscillation generator comprising a pair of serially connected parallel inductance-capacitance networks, means normally connecting said inductor-capacitor networks across said reference establishing means whereby direct current flows through the inductors when the substation is connected to the telephone central office, a transistor connected to derive electrode bias from said reference establishing means, and means establishing a feedback path for said transistor, said feedback path including a pair of nonlinear networks coupled to respective inductor-capacitor networks, said connecting means for said inductor-capacitor networks being manually operable to open the connection of the networks across said reference establishing means whereby a pair of simultaneous oscillatory discharges is produced sustained by the transistor, said connecting means being operable to connect said transistor to the telephone line.

4. The combination in accordance with claim 3 wherein said nonlinear networks comprise reactive elements shunted by respective voltage limiting diodes.

5. The combination in accordance with claim 3 wherein said connecting means includes a switch for effectively short-circuiting the speech circuit upon the generation of the calling signal.

6. The combination in accordance with claim 3 wherein said reference establishing means comprises a diode.

7. The combination in accordance with claim 3 wherein said reference establishing means comprises a resistor.

8. A calling signal generator for a telephone substation intended for connection over a telephone line to a source of direct current comprising means connected to the telephone line for establishing a reference voltage at the substation, a pair of resonant circuits each having a discretely controllable resonant frequency, switch means normally connecting said resonant circuits across said reference establishing means, a plurality of pushbuttons for selecting a discrete frequency of each of said resonant circuits, said pushbuttons being operable to open said switch means whereby an oscillatory discharge is produced in each resonant circuit, a transistor biased for linear amplification, circuit means for establishing a feedback path for said transistor, means coupling said resonant circuits to the feedback path whereby respective oscillatory discharges are introduced into the feedback path, means for limiting the level of energy in the feedback path, and means coupling the output of said transistor to the telephone line.

9. A calling signal generator for a telephone substation intended for connection over a telephone line to a source of direct current comprising means connected to the telephone line for establishing a reference voltage at the substation, a pair of resonant circuits each having a discretely controllable resonant frequency, switch means normally connecting said resonant circuits across said reference establishing means, a plurality of pushbuttons for selecting a discrete frequency of each of said resonant circuits, said pushbuttons being operable to open said switch means whereby an oscillatory discharge is produced in each resonant circuit, a transistor biased for linear amplification, circuit means for establishing a feedback path for said transistor, individual means coupling said resonant circuits to the feedback path whereby respective oscillatory discharges are introduced into the feedback path, means individual to said coupling means for limiting the level of energy in the feedback path, and means coupling the output of said transistor to the telephone line.

10. A calling signal generator for a telephone substation intended for connection over a telephone line to a source of direct current comprising means connected to the telephone line for establishing a reference voltage at the substation, a pair of resonant circuits each having a discretely controllable resonant frequency, switch means normally connecting said resonant circuits across said reference establishing means, a plurality of pushbuttons for selecting a discrete frequency of each of said resonant circuits, said pushbuttons being operable to open said switch means whereby an oscillatory discharge is produced in each resonant circuit, a transistor connected to derive electrode bias for linear amplification from said reference establishing means, circuit means for establishing a feedback path for said transistor, individual means coupling said resonant circuits to the feedback path whereby respective oscillatory discharges are introduced into the feedback path, means individual to said coupling means for limiting the level of energy in the feedback path, and means coupling the output of said transistor to the telephone line.

11. In a telephone system including a central office having a line battery supply and a calling signal receiver and a telephone line, a substation circuit comprising switchhook means for connecting the substation circuit to the telephone line, a speech circuit connected by said switchhook means across the line, means for establishing a reference voltage in series with one side of the telephone line and said speech circuit, a resonant circuit, switch means normally connecting said resonant circuit across said reference establishing means whereby current flows through said circuit when said telephone circuit is connected to the telephone line, an oscillator connected for derivation of electrode bias from said reference establishing means, means coupling said resonant circuit to the feedback path of said oscillator, said switch means being operative to interrupt the direct current path through said resonant circuit whereby an oscillatory discharge is produced and introduced into the feedback path of said oscillator, said switch means being operative to effectively connect said oscillator across the telephone line to introduce thereupon an oscillatory calling signal.

12. The combination in accordance with claim 11 wherein said switch means is operative to temporarily disable the speech circuit during the period of oscillation.

13. A telephone substation circuit for connection over a pair of line conductors to a central office including a line battery supply and a calling signal receiver comprising switchhook means for connecting the substation circuit to the pair of line conductors, a speech circuit connected by said switchhook means across said line conductors, a constant voltage device in series with one of said line conductors and said speech circuit, first and second resonant circuits seriately connected, switch means for normally connecting said resonant circuits across the constant voltage device, whereby energy is stored in said resonant circuits when said telephone circuit is connected to the line conductors, an oscillator, including electrodes connected to derive bias voltage from said constant voltage device, a feedback path for said oscillator, said feedback path including two coupled pairs of windings, means coupling respective resonant circuits to said feedback windings, individual constant voltage devices for said feedback windings to limit the feedback voltage therein, said switch means being operative to interrupt the direct current flowing through said resonant circuits whereby an oscillatory discharge is produced and introduced into the feedback path of said oscillator, said switch means also being operative to connect the output of said oscillator to said line conductors whereby a dual frequency signal is transmitted over said line conductors.

14. The combination in accordance with claim 13 wherein said feedback path includes a resistor, the value of said resistor being substantially equal in magnitude to the impedance of the respective coupled windings at their signaling frequencies.

15. An oscillation generator for multifrequency signaling systems comprising a transistor including base, emitter and collector electrodes, means for biasing said transistor electrodes for linear operation, a feedback path for said transistor including a pair of nonlinear networks each tuned to a predetermined signal frequency band, a pair of tank circuits closely coupled to respective nonlinear networks, said tank circuits connected to the bias source for said transistor and pushbutton controlled switch means for simultaneously interrupting the connection between said tank circuit and the bias source to shock excite said oscillation generator into operation at two frequencies.

16. A multifrequency oscillation generator comprising a transistor including emitter, collector and base electrodes, a voltage source for said transistor, means for biasing said transistor for linear operation, first and second series connected windings in said base electrode circuit, first and second series connected windings in said emitter electrode circuit, respective first and second windings being electromagnetically coupled together, a nonlinear resistance element in shunt with at least one of said first windings, a nonlinear resistance element in shunt with at least one of said second windings, means individual to said first and second windings for introducing an oscillatory discharge into said windings, and means deriving an output from the base and collector electrodes of said transistor.

17. A multifrequency excitation device comprising amplifying means having output and input terminals, and means coupled to said amplifying means for rendering said amplifying means capable of simultaneously producing oscillations at a plurality of frequencies, said means coupled to said amplifying means comprising a plurality of primary inductances serially connected across the output terminals of said amplifying means; a plurality of secondary inductances serially connected across the input terminals of said amplifier, each of said secondary inductances being associated with and inductively coupled with a different one of said primary inductances; and a plurality of tunable secondary circuits having a single coil means inductively coupled between a different one of said primary inductances and the secondary inductance associated therewith.

18. A selective electronic system comprising an exciting device for selectively producing simultaneous basic oscillations at a plurality of different frequencies within a predetermined band of frequencies, and a plurality of tuned secondary circuits, said secondary circuits including means for selectively causing said exciting device to produce oscillations of frequencies to which said secondary circuits are tuned within said predetermined band, said secondary circuits being coupled to said exciting device for selective and simultaneous excitation thereby, and said secondary circuits including means for causing said secondary circuits to operate in either of two stable states, one of which is oscillatory whereby said secondary circuits cause said exciting device to produce oscillations of frequencies corresponding to the frequencies to which said secondary circuits are tuned.

No references cited.

ROBERT H. ROSE, *Primary Examiner.*

L. MILLER ANDRUS, GEORGE WESTBY, BENNETT G. MILLER, *Examiners.*